United States Patent
Reiner et al.

(10) Patent No.: US 6,783,138 B2
(45) Date of Patent: Aug. 31, 2004

(54) ACTUATOR FOR ADJUSTING THE RIDE OF A VEHICLE

(76) Inventors: John Reiner, 58336 Benedict Dr., Goshen, IN (US) 46528; Ronald Bontrager, 21290 C.R. 20, Goshen, IN (US) 46528; Mahlon Bontrager, 17151 C.R. 22, Goshen, IN (US) 46528

( * ) Notice: Subject to any disclaimer, the term of this patent is extended or adjusted under 35 U.S.C. 154(b) by 6 days.

(21) Appl. No.: 09/939,363

(22) Filed: Aug. 24, 2001

(65) Prior Publication Data

US 2003/0038443 A1 Feb. 27, 2003

(51) Int. Cl.$^7$ ............................................. B60G 11/26
(52) U.S. Cl. ............................ 280/124.16; 280/6.159
(58) Field of Search ................... 280/124.116, 124.157, 280/124.158, 124.159, 124.16, 124.161, 6.157, 6.15, 6.153, DIG. 1, 6.159, 124.02, 5.5, 5.519, 5.515; 267/64.11, 64.28, 256; 701/37; 137/636.1, 627.5; 188/299.1

(56) References Cited

U.S. PATENT DOCUMENTS

| | | | | |
|---|---|---|---|---|
| 3,120,962 A | * | 2/1964 | Long, Jr. | |
| 3,559,688 A | * | 2/1971 | Fischer et al. | 137/627.5 |
| 3,592,226 A | * | 7/1971 | Graham, Jr. | 137/557 |
| 3,592,485 A | * | 7/1971 | Buhl | 280/6.159 |
| 3,836,161 A | | 9/1974 | Buhl | |
| 3,841,694 A | * | 10/1974 | Merkle | 296/35.1 |
| 3,917,307 A | * | 11/1975 | Shoebridge | 280/104 |
| 4,335,901 A | * | 6/1982 | Gladish | 280/6.151 |
| 4,580,798 A | | 4/1986 | Roelofs | |
| 4,641,843 A | | 2/1987 | Morrisroe, Jr. | |
| 4,733,876 A | | 3/1988 | Heider et al. | |
| 4,783,089 A | * | 11/1988 | Hamilton et al. | 280/6.157 |
| 4,923,210 A | | 5/1990 | Heider et al. | |
| 5,052,713 A | * | 10/1991 | Corey et al. | 280/5.5 |
| 5,161,579 A | * | 11/1992 | Anderson, Jr. | 137/627.5 |
| 5,273,308 A | | 12/1993 | Griffiths | |
| 5,375,880 A | * | 12/1994 | Fleener et al. | 280/5.514 |
| 5,566,971 A | | 10/1996 | Perlot | |
| 5,787,932 A | * | 8/1998 | Pierce | 137/627.5 |
| 5,873,581 A | * | 2/1999 | Yale | 280/5.514 |

FOREIGN PATENT DOCUMENTS

GB  2136141  * 9/1984

* cited by examiner

Primary Examiner—Douglas C. Butler

(57) ABSTRACT

An actuator assembly for moving an air valve between a position in which air is admitted to an air bag mounted in a vehicle and another position in which air is released from the air bag. The actuator assembly has a U-shaped rail that is attached to a cross member of the vehicle. The rail has a channel. A linear actuator is attached to the rail. The actuator has a moveable shaft. An actuator arm is attached to the rail and has a first end attached to the actuator. The actuator operates to linearly move the arm. A ball bearing is movably retained within the channel. The ball bearing has a stud extending from the ball bearing through the actuator arm and is attached to the actuator shaft. A mounting plate has an end attached to the air valve and another end attached to a second end of the actuator arm. The actuator operates to move the air valve so as to adjust the ride firmness of the vehicle.

9 Claims, 6 Drawing Sheets

ACTUATOR FOR ADJUSTING THE RIDE OF A VEHICLE

BACKGROUND OF THE INVENTION

1. Field of the Invention

This invention relates to vehicle suspensions. More specifically, the invention relates to an actuator that is used to adjust the ride quality of a motor home.

2. Description of the Related Art

Motor homes typically use a suspension system that uses air bags and/or coil springs or leaf springs. The ride firmness or softness of the vehicle is typically adjusted when the vehicle is stopped by manually adding or bleeding a valve attached to the airbag. The motor home has a built in air compressor to supply compressed air for this purpose. Often, the ride provided by the suspension is rough, harsh and not smooth. This is especially true in situations where the road surface changes rapidly. For example, if the suspension is adjusted for a smooth road, and the vehicle is driven down a rough road, then the suspension will have the wrong setting for passenger comfort. It is desirable for the driver to be able to adjust the firmness of the ride while the driver is operating the vehicle.

A current unmet need exists for an actuator to adjust ride quality on a vehicle that is low cost, can be operated while the vehicle is moving and is easily mounted on new and existing vehicles.

SUMMARY OF THE INVENTION

It is a feature of the invention to provide an actuator for a vehicle to adjust the ride of the vehicle.

An additional feature of the invention is to provide an actuator assembly for moving an air valve between a first position in which air is admitted to an air bag mounted in a vehicle and a second position in which air is released from the air bag. The air valve is pneumatically communicated with the air bag. The air valve has a rod in contact with an axle of the vehicle. The actuator assembly has a U-shaped rail that is attached to a cross member of the vehicle. The rail has a channel therein. A linear actuator is attached to the rail. The actuator has a moveable shaft. An actuator arm is attached to the rail and has a first end attached to the actuator. The actuator operates to linearly move the arm. A ball bearing is movably retained within the channel. The ball bearing has a stud extending from the ball bearing through the actuator arm and is attached to the actuator shaft. A mounting plate has an end attached to the air valve and another end attached to a second end of the actuator arm. The actuator operates to move the air valve between the first and second positions so as to adjust the ride firmness of the vehicle. A position plate is attached to the actuator arm and an indicator switch is mounted to the rail. The position plate engages the switch as the actuator arm is moved. The switch generates an electrical signal representative of the position of the actuator arm relative to the axle.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims.

BRIEF DESCRIPTION OF THE DRAWINGS

It is noted that the drawings of the invention are not to scale. The invention will be described with additional specificity and detail through the use of the accompanying drawings. In the drawings like numbering represents like elements between the drawings.

DETAILED DESCRIPTION OF THE PREFERRED EMBODIMENTS

Figure 1:
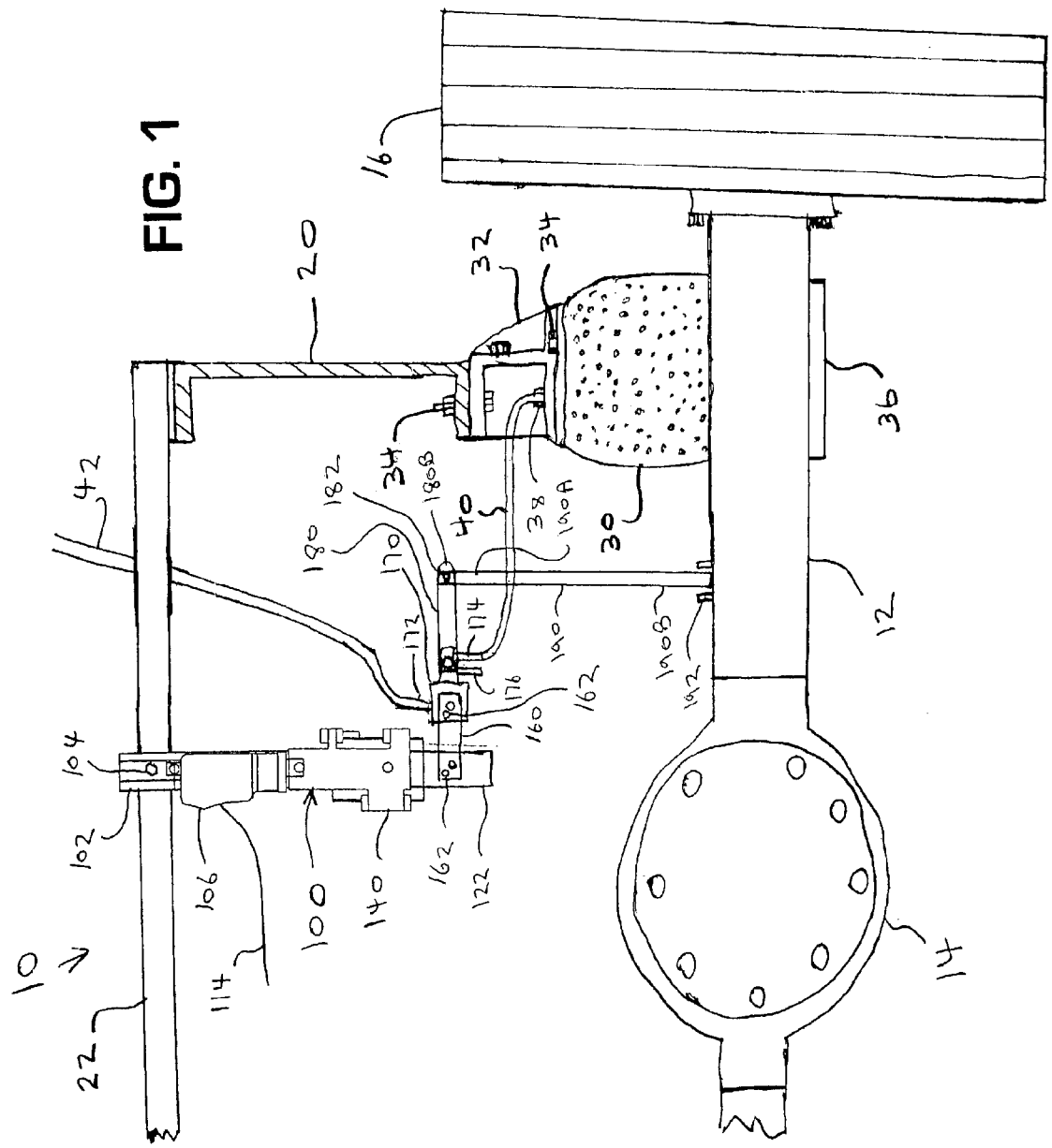
FIG. 1 is a side view looking at the rear of the motor home showing an axle and the present invention mounted to the chassis.
Figure 2:
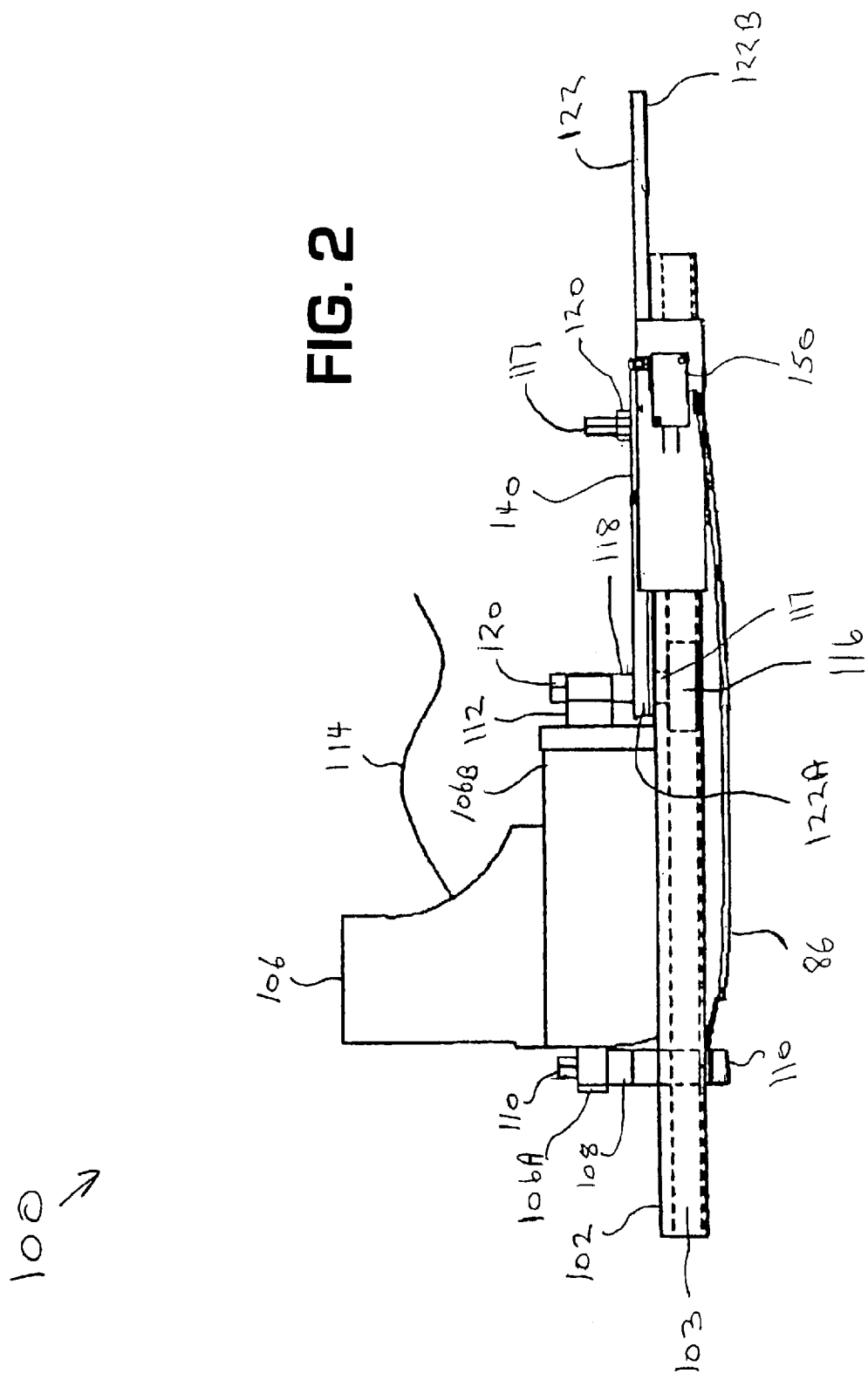
FIG. 2 is a side view of an actuator according to the present invention.
Figure 3:
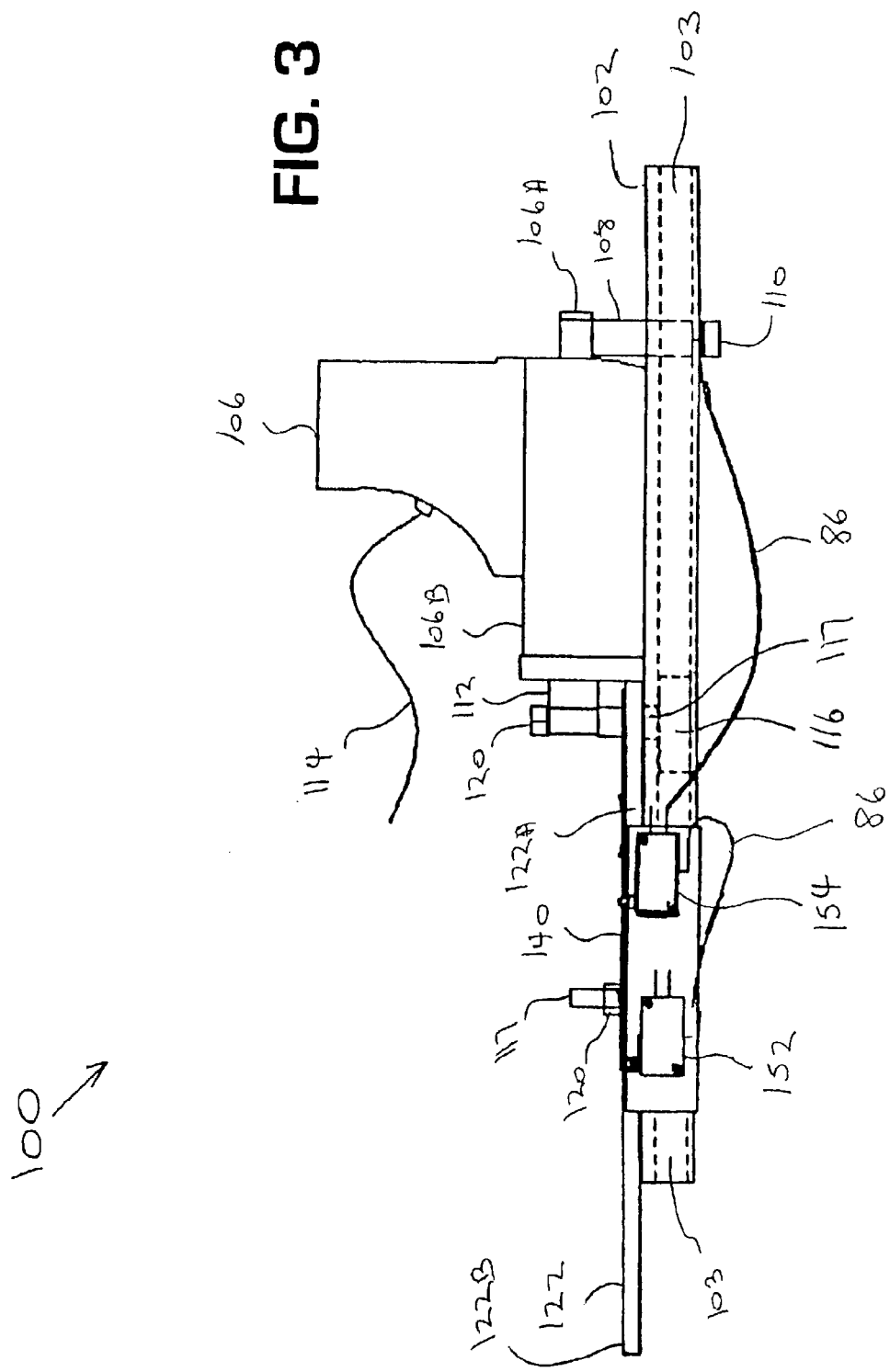
FIG. 3 is an opposite side view of FIG. 2.
Figure 4:
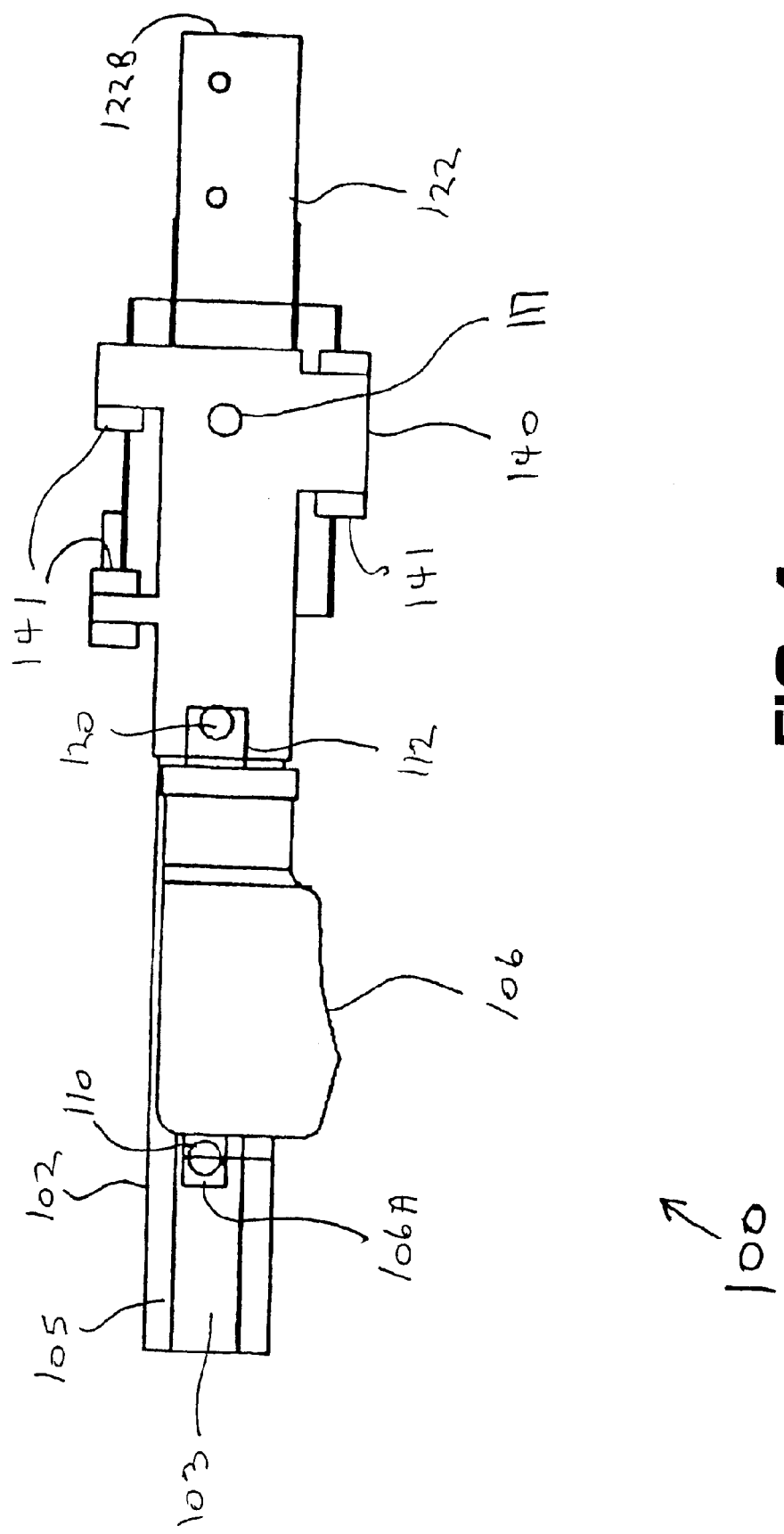
FIG. 4 is a front view of the actuator of FIG. 2.

Referring to FIGS. 1–6, there is an actuator assembly 100 shown mounted to a chassis or frame 20 of a vehicle 10. An axle 12 extends perpendicular to vehicle frame 20 and is positioned below the frame 20. Axle 12 has a differential 14 and tires 16 mounted at each end as is well known in the art. The frame has several cross-members that extend between portions of the frame 20. The cross-members could be bolted or welded to frame 20. An air spring or air bag 30 includes an upper bag frame 32, which is attached to frame 20 by bolts 34. Similarly, a lower bag frame 36 is connected the air bag 32 and axle 12. Bag frames 32 and 36 retain the air bag and attach the air bag between the frame and the axle. The air bag 32 is a flexible rubber bag whose inflation can be adjusted by adding air pressure or releasing air pressure. An air inlet 38 is connected to the air bag to admit or release air. Air inlet 38 is connected to an air bag air hose 40.

Actuator assembly 100 has an elongated U-shaped rail 102 that is attached with one or more bolts 104 to cross-member 22. An aperture (not shown) in rail 102 allows rail 102 to be bolted to cross-member 22. Rail 102 has a rolled lip 105 and a channel 103 that runs within the rail. Rail 102 is formed from steel. A linear electric motor or actuator 106 is attached to rail 102. Actuator 106 is commercially available from Warner Electric Corporation. Actuator 106 has an end 106A that is attached to rail 102 using a pair of bolts 110 that are screwed into a threaded spacer 108. End 106 has an aperture (not shown) through which one of bolts 110 passes. Actuator 106 has a shaft 112 that moves linearly in and out of actuator end 106B. A wire harness 114 is connected to actuator 106 to provide power and ground connections.

A pair of ball bearings 116 has attached threaded studs 117. The ball bearings 116 are located in and retained by channel 103. One of studs 117 passes through an aperture (not shown) in an actuator arm 122 at end 122A and through and aperture (not shown) in shaft 112. A bushing 118 is located over stud 117, between shaft 112 and arm 122. A nut 120 mates with threads on stud 117. The other bearing 116 and stud 117 are mounted in the middle of arm 122. Similarly, stud 117 passes through an aperture (not shown) in actuator arm 122 and is retained by nut 120. Ball bearings 116 and rail 102 allow actuator arm 122 to be supported and move linearly when actuator 106 is turned on. Actuator arm 122 has another end 122B. Actuator arm 122 is formed from steel.

A position plate 140 is attached to the actuator arm and indicator switches 150,152 and 154 are mounted to rail 102. Position plate 140 has projections 141 to engage switches 150,152 and 154. The switches are commercially available from Microswitch Corporation. The position plate 140 engages the switches as the actuator arm 122 is moved. The switches are connected together by jumper wires 86 to supply power and signals. Jumper wires 86 are connected to wire harness 114. The switches generate an electrical signal representative of the position of the actuator arm relative to the axle. Each of the switches generates a different signal depending upon the position of arm 122 relative to axle 12. For example, switch 150 generates a signal indicating a soft ride firmness or quality which corresponds to low air pressure in the air bag. Switch 152 generates a signal indicating a medium ride firmness or quality. Switch 154 generates a signal indicating a firm ride firmness or quality which corresponds to high air pressure in the air bag.

Switches 150, 152 and 154 are connected to a control panel 156 in a passenger compartment of the vehicle through wire harness 114. The control panel has indicator lights 145, 146 and 147 that are connected to switches 150, 152 and 154. When the switches are engaged by the position plate, the corresponding light on the control panel lights up indicating the current ride position or quality. The ride quality is adjusted by a user depressing control switches 157A and 157B. Control switch 157B is connected to actuator 106 by a wire harness 114.

Figure 5:
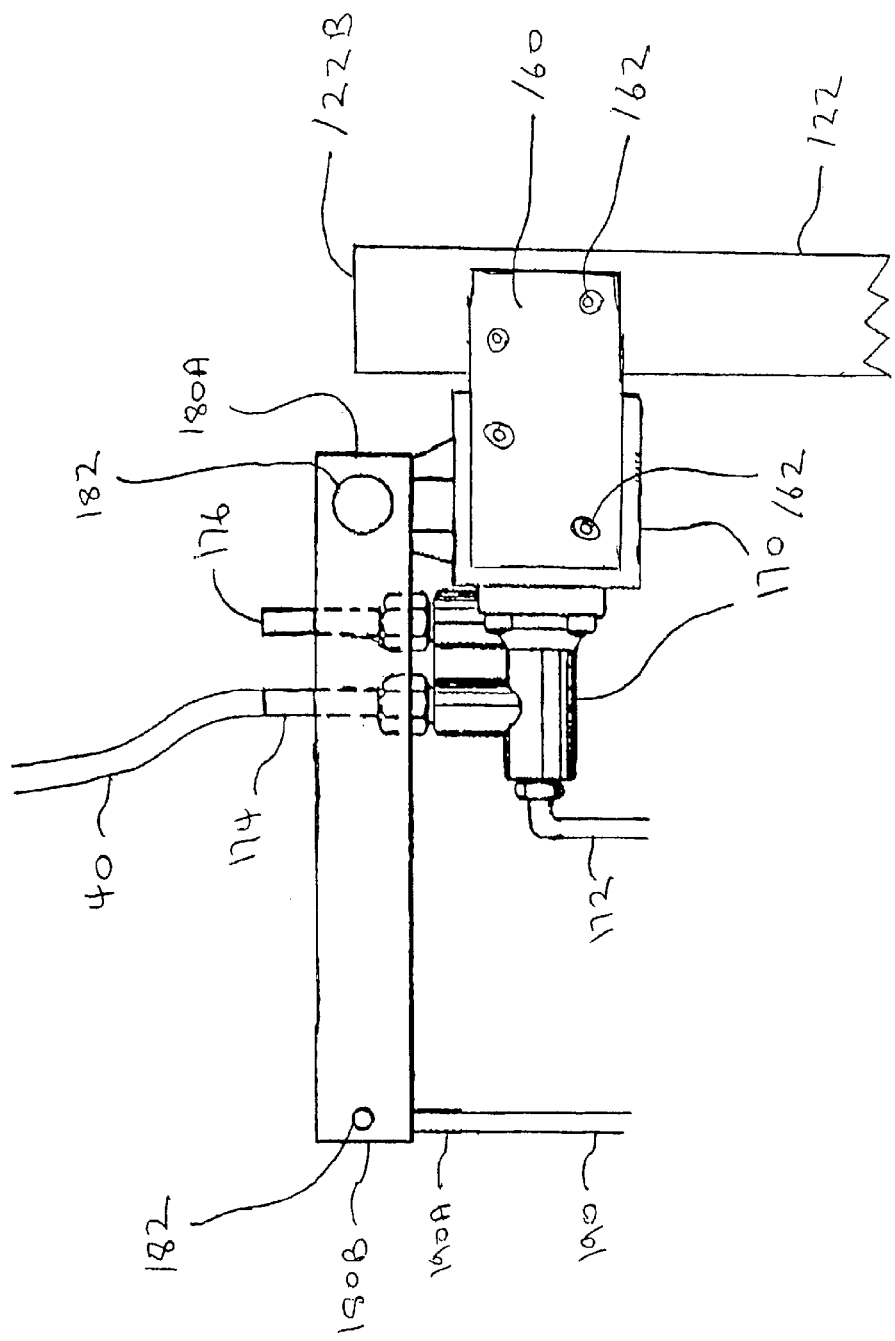
FIG. 5 is a front view of the air valve of FIG. 1.
Figure 6:
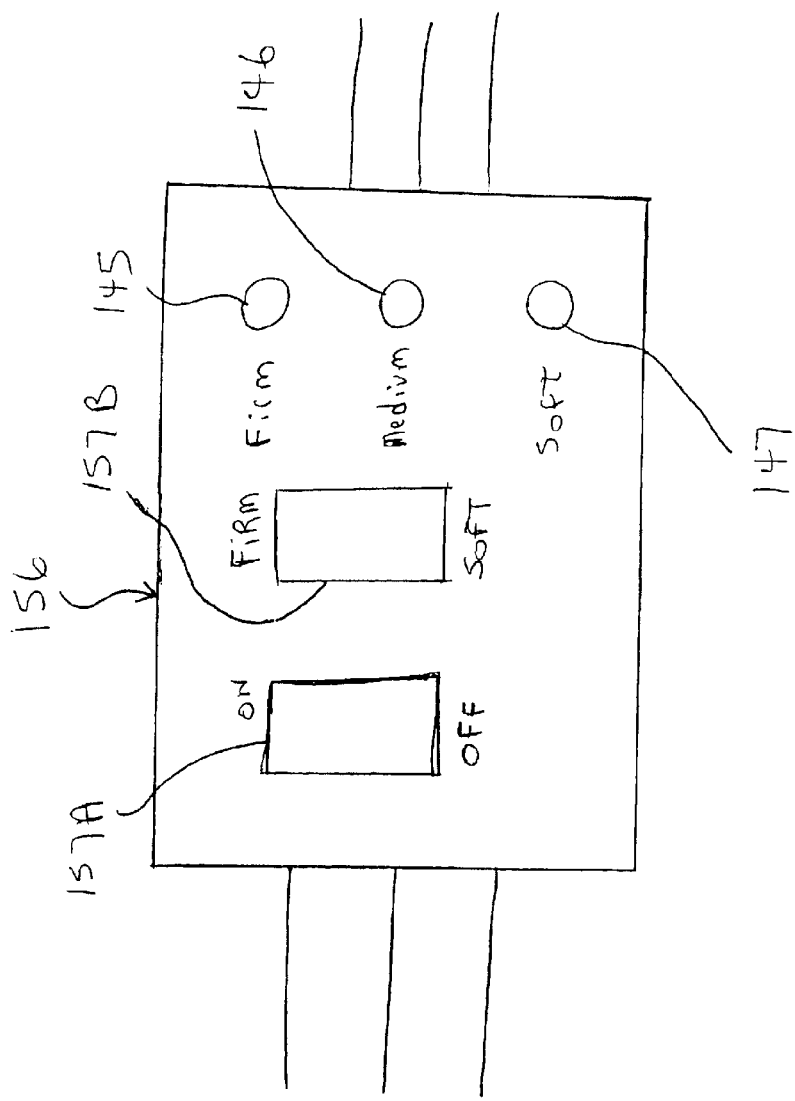
FIG. 6 is a front view of a control panel.

Turning now to FIGS. 1 and 5, actuator arm 122 is connected to a mounting plate 160 by fasteners 162. Mounting plate 160 is also connected to air valve 170 by fasteners 160. Air valve 170 is commercially available from Hadley Corporation. Air valve 170 has an inlet nozzle 172, pressurization nozzle 174 and de-pressurization nozzle 176. Inlet nozzle 172 is connected to air hose 42. Air hose 42 supplies a source of pressurized air from an air compressor that would be driven by an engine in the vehicle. Pressurization nozzle 174 is connected to air bag air hose 40 and supplies pressurized air the air bag. De-pressurization nozzle 176 is vented to the atmosphere to release pressure in the air bag.

A link 180 has ends 180A and 180B. End 180A is rotatably attached to air valve 170 by fastener 182. The other end 180B of link 180 is rotatably attached to a rod 190. Rod 190 has ends 190A and 190B. Another fastener 182 attaches rod 190 to link 180. Rod 190 has end 190B in contact with axle 12. Rod 190 is retained adjacent to axle 12 by a retainer 192.

During operation, an operator depresses control switch 157A which provides power to control panel 156. Switch 157B is a momentary rocker switch. Moving switch 157B upwardly causes actuator arm 122 to be extended from rail 102. Since arm 122 is connected to air valve 170, air valve 170 moves down. Since, link 180 is fixed relative to the axle, link 180 rotates about fastener 182 opening valve 170 and allowing air pressure from air hose 42 to flow through valve 170 and air hose 40 into air bags 30. Thus the operator can cause pressure in air bag 30 to increase which creates a firmer or stiffer ride for the vehicle. More pressure in air bag 30 also raises the frame relative to the axle. Similarly, if an operator moves momentary switch 157B downwardly, this turns on actuator 106 in an opposite direction causing actuator arm 122 to be retracted from rail 102. Since arm 122 is connected to air valve 170, air valve 170 moves up. Since, link 180 is fixed relative to the axle, link 180 rotates about fastener 182 opening valve 170 and allowing air pressure from air hose 40 to flow through valve 170 and nozzle 176 releasing air from air bags 30. Thus, the operator can cause pressure in air bag 30 to decrease, which creates a softer or more compliant ride for the vehicle. Less pressure in air bag 30 lowers the frame relative to the axle. When the link 180 is perpendicular to actuator arm 122, the air valve is closed and the air bag pressure remains the same.

As arm 122 moves, position plate 140 moves and projection 141 engages one of switches 150, 154 or 152. The switches turn on one of lights 145, 146 and 147 indicating to the operator the ride position or quality.

Three or four actuator assemblies 100 are mounted per vehicle. Actuator 100 is self calibrating. The actuator assembly can be used on any vehicle that uses an air spring suspension.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An actuator assembly for a vehicle, the actuator assembly adapted to be controlled by a vehicle operator, the actuator assembly comprising:
    a) a cross member of the vehicle;
    b) a rail having a lip attached to the cross member;
    c) an actuator attached to the rail;
    d) an actuator arm slidably attached to the rail and having a first end attached to the actuator, the actuator operable to linearly move the arm;
    e) a mounting plate having an end attached to an air valve and another end attached to a second end of the actuator arm, the actuator operable to move the air valve between a first position in which air is admitted to an air bag mounted in the vehicle and a second position in which air is released from the air bag;
    f) an air hose pneumatically communicating the air valve and the air bag;
    g) a rod having an end in contact with an axle of the vehicle and another end connected to the air valve; and
    h) a control switch connected to the actuator to allow the vehicle operator to move the actuator.

2. The actuator assembly according to claim 1, further comprising:
    a) a channel located within the rail;
    b) a first ball bearing located within the channel and retained by the lip; and
    c) a stud extending from the first ball bearing through the actuator arm and attached to an actuator shaft.

3. The actuator assembly according to claim 2 wherein a second ball bearing is located within the channel spaced apart from the first ball bearing, the second ball bearing having a second stud attached to the actuator arm.

4. The actuator assembly according to claim 1, further comprising:
    (a) a position plate attached to the actuator arm;
    (b) a first indicator switch mounted to the rail, the position plate operable to engage the first switch as the actuator arm is moved, the switch generating an electrical signal representative of the position of the actuator arm relative to the axle.

5. The actuator assembly according to claim 4, further comprising:
    (a) a second indicator switch mounted to the rail, the position plate operable to engage the second switch as the actuator arm is moved, the second switch generating an electrical signal representative of soft ride firmness.

6. The actuator assembly according to claim 5, further comprising:
(a) a third indicator switch mounted to the rail, the position plate operable to engage the third switch as the actuator arm is moved, the third switch generating an electrical signal representative of hard ride firmness.

7. The actuator assembly according to claim 6, wherein a control panel is connected to the indicator switches and to the linear actuator, the control panel providing a signal to the operator indicative of the ride firmness of the vehicle.

8. An actuator assembly for moving an air valve between a first position in which air is admitted to an air bag mounted in a vehicle and a second position in which air is released from the air bag, the air valve pneumatically communicating with the air bag, the air valve having a rod in contact with an axle of the vehicle, the assembly comprising:
a) a rail attachable to a cross member of the vehicle;
b) an actuator attached to the rail, the actuator having a movable shaft;
c) an actuator arm attached to the rail and having a first end attached to the actuator, the actuator operable to linearly move the arm;
d) a ball bearing movably retained within the rail, the ball bearing having a stud extending from the ball bearing through the actuator arm and attached to the actuator shaft; and
e) a mounting plate having an end attached to the air valve and another end attached to a second end of the actuator arm, the actuator operable to move the air valve between the first and second positions so as to adjust the ride firmness of the vehicle.

9. The actuator assembly according to claim 8, wherein a position plate is attached to the actuator arm and at least one indicator switch is mounted to the rail, the position plate operable to engage the switch as the actuator arm is moved, the switch generating an electrical signal representative of the position of the actuator arm relative to the axle.

* * * * *